(12) United States Patent
Degertekin

(10) Patent No.: US 7,752,898 B2
(45) Date of Patent: Jul. 13, 2010

(54) DEVICES FOR PROBE MICROSCOPY

(75) Inventor: Fahrettin L. Degertekin, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 351 days.

(21) Appl. No.: 11/838,833

(22) Filed: Aug. 14, 2007

(65) Prior Publication Data

US 2008/0168830 A1 Jul. 17, 2008

Related U.S. Application Data

(63) Continuation-in-part of application No. 11/260,238, filed on Oct. 28, 2005.

(60) Provisional application No. 60/837,803, filed on Aug. 15, 2006.

(51) Int. Cl.
*G01B 5/28* (2006.01)

(52) U.S. Cl. ...................................................... 73/105

(58) Field of Classification Search .................... 73/105
See application file for complete search history.

(56) References Cited

U.S. PATENT DOCUMENTS

| | | |
|---|---|---|
| 5,231,286 A | 7/1993 | Kajimura et al. |
| 5,245,863 A | 9/1993 | Kajimura et al. |
| 5,247,186 A | 9/1993 | Toda |
| 5,253,515 A | 10/1993 | Toda et al. |
| 5,260,567 A | 11/1993 | Kuroda et al. |
| 5,445,011 A | 8/1995 | Ghislain et al. |
| 5,465,611 A | 11/1995 | Ruf et al. |
| 5,689,107 A | 11/1997 | Hsu et al. |
| 5,900,729 A | 5/1999 | Moser et al. |
| 5,909,981 A | 6/1999 | Atalar et al. |
| 5,923,033 A | 7/1999 | Takayama et al. |
| 6,249,747 B1 | 6/2001 | Binnig et al. |
| 6,272,907 B1 | 8/2001 | Neukermans et al. |
| 6,291,927 B1 | 9/2001 | Percin et al. |
| 6,310,990 B1 | 10/2001 | Putnam et al. |

(Continued)

FOREIGN PATENT DOCUMENTS

JP  05248810 A  9/1993

(Continued)

OTHER PUBLICATIONS

Yaralioglu et al., "Analysis and Design of an Interdigital Cantilever as a Displacement Sensor" Journal of Applied Physics, Jun. 15, 1998, vol. 83, No. 12, pp. 7405-7415.

(Continued)

*Primary Examiner*—Daniel S Larkin
(74) *Attorney, Agent, or Firm*—Bryan W. Bockhop; Bockhop & Associates, LLC

(57) ABSTRACT

An atomic force microscope sensing structure includes a substrate, a flexible membrane and an actuating element. The flexible membrane has a first end that is clamped to the substrate and an opposite second end that is clamped to the substrate. A central portion of the membrane and the substrate define a first gap width therebetween. A peripheral portion of the membrane and the substrate define a second gap width therebetween. The first gap width is different from the second gap width. The actuating element is disposed at least adjacent to the first end and the second end and is configured to displace the membrane relative to the substrate.

5 Claims, 3 Drawing Sheets

U.S. PATENT DOCUMENTS

| | | |
|---|---|---|
| 6,400,166 B2 | 6/2002 | Babson et al. |
| 6,455,109 B1 | 9/2002 | Percin et al. |
| 6,567,572 B2 | 5/2003 | Degertekin et al. |
| 6,672,144 B2 | 1/2004 | Adderton et al. |
| 6,676,813 B1 | 1/2004 | Pelekhov et al. |
| 6,836,112 B2 | 12/2004 | Hennessy |
| 6,862,923 B2 | 3/2005 | Buguin et al. |
| 6,862,924 B2 | 3/2005 | Xi et al. |
| 6,882,429 B1 | 4/2005 | Weitekamp et al. |
| 2001/0000279 A1 | 4/2001 | Daniels et al. |
| 2001/0013574 A1 | 8/2001 | Warren et al. |
| 2001/0035700 A1 | 11/2001 | Percin et al. |
| 2001/0049959 A1 | 12/2001 | Neukermans et al. |
| 2003/0042409 A1 | 3/2003 | Warren et al. |
| 2004/0065821 A1 | 4/2004 | Warren et al. |
| 2004/0206165 A1 | 10/2004 | Minne et al. |
| 2004/0216517 A1 | 11/2004 | Xi et al. |
| 2005/0066714 A1 | 3/2005 | Adderton et al. |
| 2005/0180678 A1 | 8/2005 | Panepucci et al. |

FOREIGN PATENT DOCUMENTS

| | | |
|---|---|---|
| JP | 07065428 A | 3/1995 |
| JP | 10090287 A | 4/1998 |
| JP | 2004093574 A | 3/2004 |

OTHER PUBLICATIONS

Solgaard et al., "Deformable Grating Optical Modulator" Optics Letters, May 1, 1992, vol. 17, No. 9, pp. 688-690.

Cooper et al., "High-Resolution Micromachined Interferometric Accelerometer" Applied Physics Letters, May 29, 2000, vol. 70, No. 22, pp. 3316-3318.

Manalis et al., "Interdigital Cantilevers for Atomic Force Microscopy" Applied Physics Letters, Dec. 16, 1996, vol. 69, No. 25, pp. 3944-3946.

Wu, "Micromachining for Optical and Optoelectronic Systems" Proceedings of the IEEE, Nov. 1997, vol. 85, No. 11, pp. 1833-1856.

Chen et al., "Overview of Three-Dimensional Shape Measurement Using Optical Methods" Optical Engineering, Jan. 2000, Vol. 39, No. 1, pp. 10-22.

Shiono et al., "Planar-optic-disk Pickup with Diffractive Micro-optics" Applied Optics, Nov. 1, 1994, vol. 33, No. 31, pp. 7350-7355.

Dewitt et al., "Range-finding Method Using Diffraction Gratings" Applied Optics, May 10, 1995, vol. 34, No. 14, pp. 2510-2521.

Jahns et al., "Planar Integration of Free-space Optical Components" Applied Optics, May 1, 1989, vol. 28, No. 9, pp. 1602-1607.

DEVICES FOR PROBE MICROSCOPY

CROSS-REFERENCE TO RELATED APPLICATION(S)

This application claims the benefit of U.S. Provisional Patent Application Ser. No. 60/837,765, filed Aug. 14, 2006, the entirety of which is hereby incorporated herein by reference.

This application is a continuation-in-part of U.S. patent application Ser. No. 11/260,238, filed on Oct. 28, 2005 (Publ. No. US-2007-0103697-A1), which is incorporated herein by reference.

This application is related to the following pending U.S. Patent Applications and incorporates them herein by reference: Ser. No. 11/405,051, filed on Apr. 17, 2006 (Publ. No. US-2006-0181712-A1), now U.S. Pat. No. 7,440,117; Ser. No. 11/297,097, filed on Dec. 8, 2005 (Publ. No. US-2006-0227845-A1), now U.S. Pat. No. 7,485,847; Ser. No. 11/476,625, filed on Jun. 29, 2006 (Publ. No. US-2007-0012094-A1), now U.S. Pat. No. 7,637,149; Ser. No. 11/398,650, filed on Apr. 6, 2006 (Publ. No. US-2006-0283338-A1) now U.S. Pat. No. 7,552,625; Ser. No. 11/548,005, filed on Oct. 10, 2006, (Publ. No. US-2007-0283338-A1), now U.S. Pat. No. 7,441,447; Ser. No. 11/548,531, filed on Oct. 11, 2006 (Publ. No. US-2007-0107502-A1), now U.S. Pat. No. 7,461,543; Ser. No. 11/552,274, filed on Oct. 24, 2006 (Publ. No. US-2007-0089496-A1), now U.S. Pat. No. 7,395,698; Ser. No. 11/777,518, filed on Jul. 13, 2007; and Ser. No. 11/838,547 filed on Aug. 14, 2007 (Publ. No. US-2008-0209988-A1).

STATEMENT OF GOVERNMENT INTEREST

This invention was made with support from the U.S. government under grant number R01 A1060799-01A2, awarded by National Institutes of Health. The government may have certain rights in the invention.

BACKGROUND OF THE INVENTION

1. Field of the Invention

The present invention relates to atomic force microscopy and, more specifically, to an atomic force microscopy system employing a membrane-type actuator.

2. Description of the Prior Art

Existing atomic force microscopes (AFM) have been used to probe a wide range of physical and biological processes, including mechanical properties of single molecules, electric and magnetic fields of single atoms and electrons. Moreover, cantilever based structures inspired by the AFM have been a significant driver for nanotechnology resulting in chemical sensor arrays, various forms of lithography tools with high resolution, and terabit level data storage systems. Despite the current rate of success, the AFM needs to be improved in terms of speed, sensitivity, and an ability to generate quantitative data on the chemical and mechanical properties of the sample. For example, when measuring molecular dynamics at room temperature, the molecular forces need to be measured in a time scale that is less than the time of the thermal fluctuations to break the bonds. This requires a high speed system with sub-nanonewton and sub-nanometer sensitivity.

Current cantilever-based structures for AFM probes and their respective actuation methodologies lack speed and sensitivity and have hindered progress in the aforementioned areas. Imaging systems based on small cantilevers have been developed to increase the speed of AFMs, but this approach has not yet found wide use due to demanding constraints on optical detection and bulky actuators. Several methods have been developed for quantitative elasticity measurements, but the trade-off between force resolution, measurement speed, and cantilever stiffness has been problematic especially for samples with high compliance and high adhesion. Cantilever deflection signals measured during tapping mode imaging have been inverted to obtain elasticity information with smaller impact forces, but complicated dynamic response of the cantilever increases the noise level and prevents calculation of the interaction forces. Arrays of AFM cantilevers with integrated piezoelectric actuators have been developed for parallel lithography, but low cantilever speed and complex fabrication methods have limited their use.

Moreover, conventional methods of imaging with scanning probes can be time consuming while others are often destructive because they require static tip-sample contact. Dynamic operation of AFM, such as the tapping-mode, eliminates shear forces during the scan. However, the only free variable in this mode, the phase, is related to the energy dissipation and it is difficult to interpret. Further, the inverse problem of gathering the time-domain interaction forces from the tapping signal is not easily solvable due to complex dynamics of the AFM cantilever. Harmonic imaging is useful to analyze the sample elastic properties, but this method recovers only a small part of the tip-sample interaction force frequency spectrum.

Therefore, there is a need to overcome these and other problems of the prior art associated with probe microscopy.

SUMMARY OF THE INVENTION

The disadvantages of the prior art are overcome by the present invention which, in one aspect, is an atomic force microscope sensing structure that includes a substrate, a flexible membrane and an actuating element. The flexible membrane has a first end that is clamped to the substrate and an opposite second end that is clamped to the substrate. A central portion of the membrane and the substrate define a first gap width therebetween. A peripheral portion of the membrane and the substrate define a second gap width therebetween. The first gap width is different from the second gap width. The actuating element is disposed at least adjacent to the first end and the second end and is configured to displace the membrane relative to the substrate.

In another aspect, the invention is an atomic force microscope actuating system that includes a substrate, a flexible membrane and an actuating element. The flexible membrane has a first end that is clamped to the substrate and an opposite second end that is clamped to the substrate. The actuating element is disposed at least adjacent to the first end and the second end and is configured to displace the membrane relative to the substrate. The actuating element includes a first member and a spaced apart second member. The first member is configured to displace the membrane independently from the second member, thereby allowing movement of the central portion of the membrane in a direction that is other than normal to the substrate.

In another aspect, the invention is an atomic force microscopy system for sensing a property of a sample that includes a substrate, a probe sensor, an environment sensor and a processor. The probe sensor is disposed on a top surface of the substrate and is configured to sense the property of the sample. The probe sensor includes a displacement sensor that measures a displacement of the probe from the top surface of the substrate. The environment sensor is disposed adjacent to the probe sensor on the top surface of the substrate and is spaced apart therefrom. The environment sensor is configured to sense a property of an environment into which the probe sensor and the environment sensor are placed. The processor is responsive to input from the probe sensor and the environment sensor. The processor is configured to remove non-sample related variations in information received from the probe sensor based on information received from the environment sensor, thereby generating information relating to the property of the sample.

In yet another aspect, the invention is a method of making a membrane-type probe sensor, in which a mold of a shape of a probe is etched onto a solid substrate. A film is deposited onto the substrate so that a portion of the film forms a cast in the mold. The film is patterned so as to remove a portion of the film around the cast. A membrane material is deposited onto the substrate and the cast, thereby forming a membrane. The membrane is affixed to a support structure. The substrate is removed, thereby leaving the cast and the membrane.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
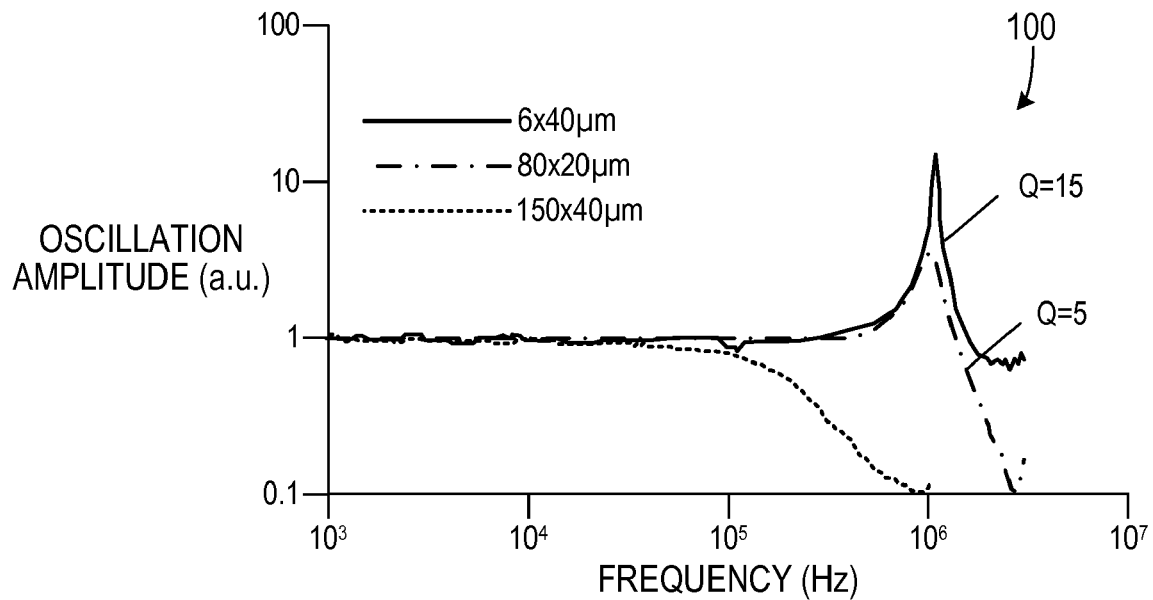
FIG. 1 is a graph showing oscillation amplitude of an AFM probe as a function of frequency for various membrane sizes.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

With respect to membrane-type sensing devices, the gap thickness and the dimensions of the mechanical structure can be critical in adjusting the dynamics of the device based on squeeze film damping effects as well as having a clamped-clamped beam like structure to allow for air to move easily in the gap. Optically measured data 100 for some aluminum clamped-clamped beam structures for 2.5 pm gap are shown in FIG. 1. This graph demonstrates that device dimensions can be adjusted to have high over-damped or under-damped responses. These curves are for 0.8 μm thick aluminum devices. This demonstrates that one can tune a device behavior by controlling dimensions and gaps. Simple squeeze film models can be used to model this behavior and design devices.

In addition to designing a gap during fabrication, the effective gap of the device can be changed by applying bias during operation. Furthermore, the device can be brought close to collapse by applying bias to increase its mechanical sensitivity (spring constant) for applications requiring extremely small spring constants. One can also have a digital sensing device, where the FIRAT membrane is brought close to collapse and a small change on the force on the membrane can lead to collapse and a large detection signal.

Figure 2:
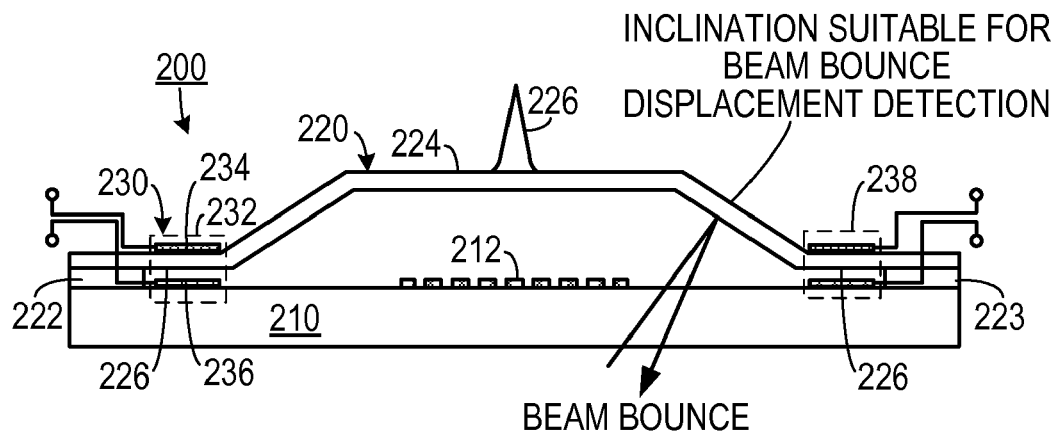
FIG. 2 is a side schematic view of membrane-type probe with a varying chamber height.

As shown in FIG. 2, one embodiment of the invention is an atomic force microscope sensing structure 200 that includes a substrate 210. A flexible membrane 220, which may have a probe 226 attached thereto, has a first end 222 that is clamped to the substrate 210 and an opposite second end 223 that is also clamped to the substrate 210. A central portion 224 of the membrane 220 and the substrate 210 define a first gap width therebetween. A peripheral portion 226 of the membrane 220 and the substrate 210 define a second gap width therebetween, which is less than the first gap width.

An actuating element 230, which includes a first member 232 and a spaced apart second member 238, displaces the membrane 220 from the substrate 210. The first member 232 and the second member 238 are configured to displace the membrane independently from each other, thereby allowing movement of the central portion of the membrane in a direction that is other than normal to the substrate. Each member 232 and 238 may include a first electrode 234 and a spaced apart second electrode 236, which actuate the membrane 220 with electrostatic force.

In one embodiment, the substrate 210 is transparent and a diffraction grating membrane 212 is disposed on the substrate 210 to facilitate measurement of the displacement of the membrane 220 by detecting a diffraction pattern of a light beam reflected off of a surface of the membrane 220 through the diffraction grating 212.

One advantage of this embodiment is that by having a smaller gap under the actuation member 230, lower actuation voltages are required. However, having a larger gap under the central portion 224 of the membrane 220 gives rise to improved membrane dynamics. While a diffraction grating 212 is shown, this embodiment may also measure displacement with a beam bounce method. Also, these measuring systems can both be used for large range and sensitivity.

Figure 3A:
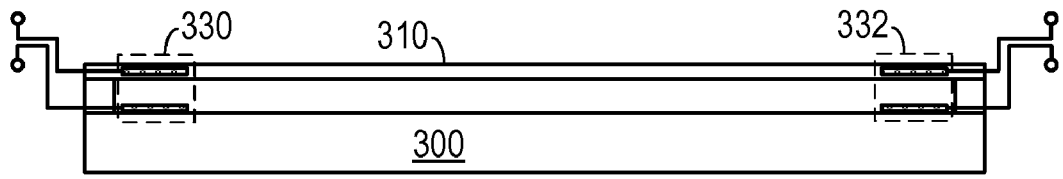
FIG. 3A-3C are side schematic views of membrane-type actuators in various configurations.
Figure 3B:
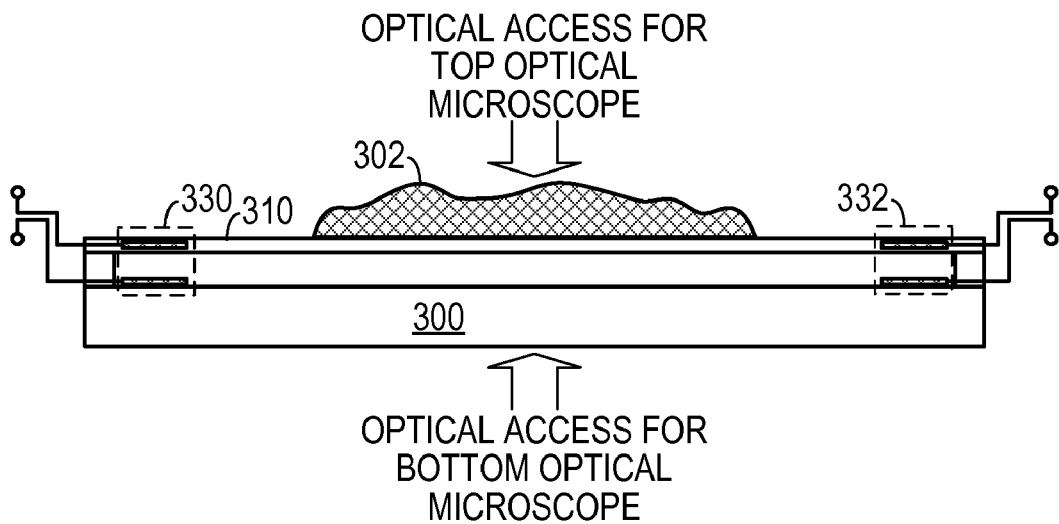
Figure 3C:
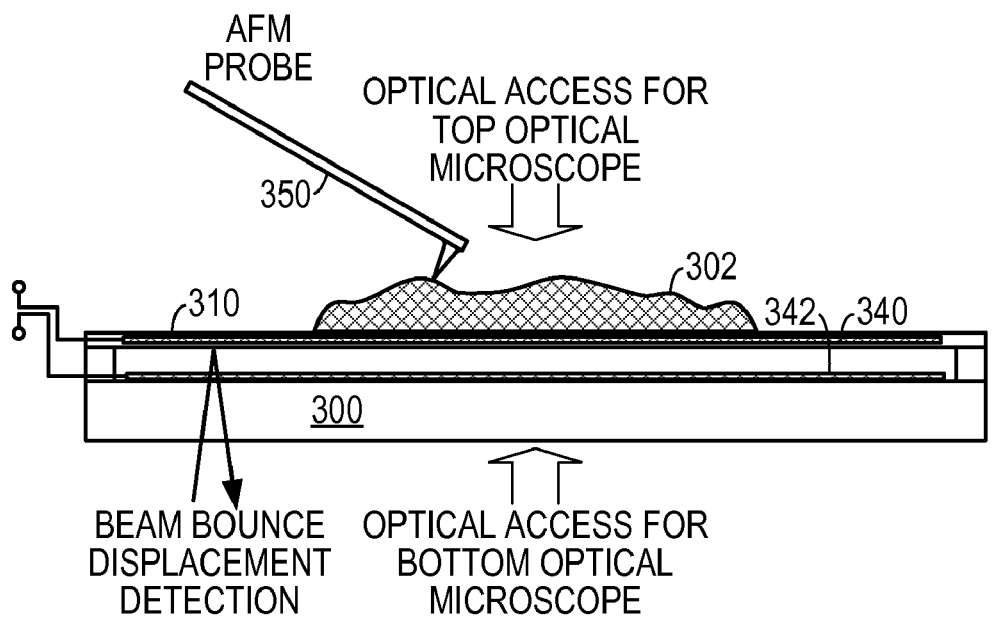

In certain applications, as shown in FIGS. 3A-3C, optical imaging of a sample 302 is desirable. In fact, optical access both from the top and the bottom side of the sample 302 may be particularly important. In such a case, the substrate 300 and the membrane 310 are made from a transparent material. (A transparent substrate 300 can include materials such as glass or quartz, for example.) In an application where differential actuation is needed, the embodiment may be supplied with a first actuator 330 and a spaced apart second actuator 332. Where non-differential actuation is required, the actuator can include a first transparent electrode 340 (which can include indium tin oxide, for example) and a spaced apart second transparent electrode 342. Note that use of semitransparent membranes or beams can be another solution, where the structures have enough reflectivity for optical detection and enough transparency to see the sample though the device. Also, this embodiment can include an AFM probe 350 (such as a cantilever probe) to perform additional imaging.

Figure 4:
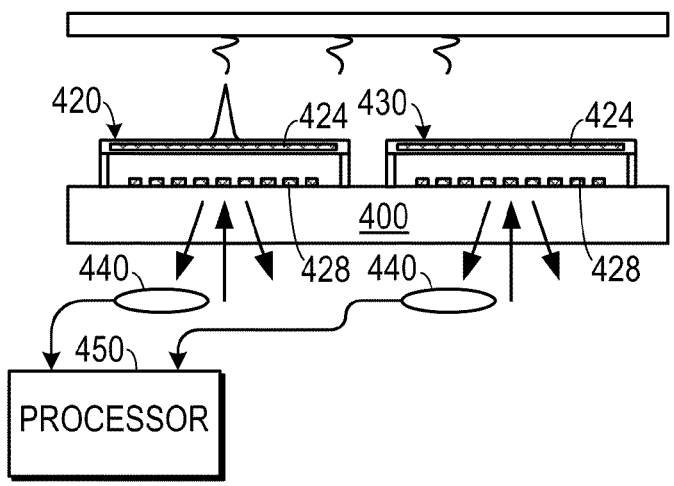
FIG. 4 is a side schematic view of a membrane-type sensor with a reference membrane.
Figure 5A:
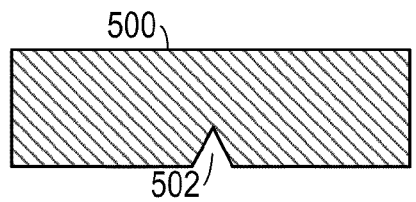
FIG. 5A-5F is a series of side schematic views showing fabrication of a probe tip.
Figure 5B:
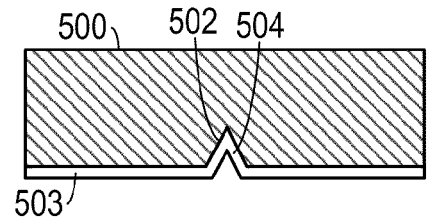
Figure 5C:
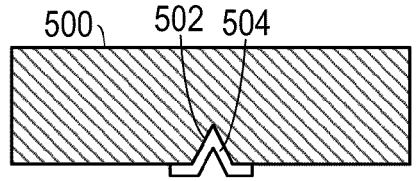
Figure 5D:
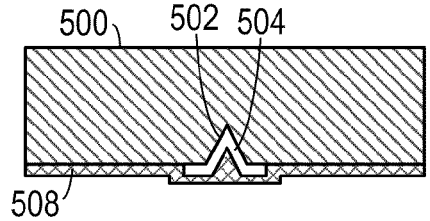
Figure 5E:
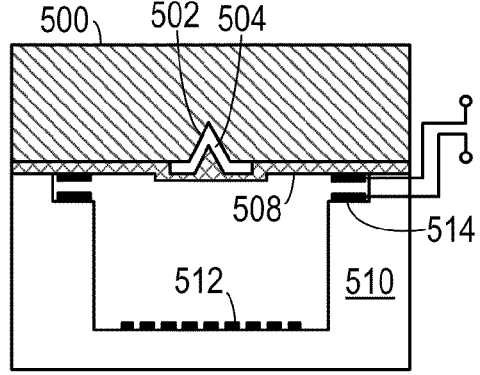
Figure 5F:
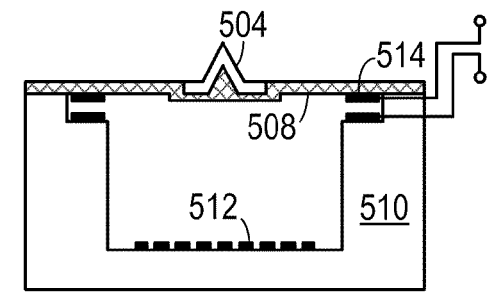

In an environment that interacts with the AFM sensing system, it may be desirable to include feedback regarding environmental conditions to provide more accurate imaging of the sample. For example, when imaging a functionalized surface, pressure fluctuations and crosstalk from other elements and the like can impact imaging measurements. To correct for such environmental influences, as shown in FIG. 4, both a probe sensor 420 and an environment sensor 430 may be placed on the substrate 400.

The probe sensor 420 (such as a FIRAT membrane type sensor) senses the property of the sample, while the environment sensor 430 (which can also be a membrane type sensor) senses at least one property of the environment into which the probe sensor 420 and the environment sensor 430 are placed. A processor 450 is responsive to input from the probe sensor 420 and the environment sensor 430 and removes non-sample related variations in information received from the probe sensor 420 based on information received from the environment sensor 430.

The probe sensor 420 and the environment sensor 430 may each include a diffraction grating 428 and a reflective surface 424 and a light detector 440 that detects a diffraction pattern of light reflecting off of the reflective surface 424. A light source (not shown) can direct a laser beam to the reflective surface 424.

Having extra FIRAT structures next to devices that are used for real measurement can help eliminate some of the common mode noise such as due to pressure variations, cross talk issues. These may be important especially for array operation and in fluids where many membranes will be immersed in the same liquid environment and pressure fluctuations, other chemical changes can affect the devices during or between operation of the array. Similarly, for imaging array applications this may be important, as slow variations, etc., can generate common mode signals. Note that optical readout using a grating can be beneficial since a single laser can be used to illuminate both the measurement and the reference membrane and by taking the difference signal from corresponding detectors, both the laser intensity noise and other common mode noise can be removed from the measurement.

One method of making membrane-type sensors is shown in FIGS. 5A-5F. Initially, a mold 502 of a shape of a probe is etched onto a solid substrate 500. A film 503, such as a silicon nitride film, is deposited onto the substrate 500 so that a portion of the film forms a cast 504 in the mold 502. The film 503 is patterned (e.g., by etching) so as to remove a portion of the film 503 around the cast 504. A membrane material 508 (such as polymer or a parylene) is deposited onto the substrate 500 and the cast 504 and the membrane 508 is affixed to a support structure 510. The substrate 500 is then removed, thereby leaving the cast 504 and the membrane 508. Actuation electrodes 514 and a diffraction grating 512 may also be deposited onto the rigid structure 510.

This is a way to have sharp tips on soft polymer membranes for parallel biomolecular measurements. In the embodiment shown, the device includes a large gap for softness of the structure and a small gap for effective electrostatic actuation. Also, a dual-grating structure may be included to increase the measurement range.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An atomic force microscope sensing structure, comprising:
   a. a substrate;
   b. a flexible membrane that has a first end that is clamped to the substrate and an opposite second end that is clamped to the substrate, a central portion of the membrane and the substrate defining a first gap width therebetween, and a peripheral portion of the membrane and the substrate defining a second gap width therebetween, the first gap width being different from the second gap width; and
   c. an actuating element disposed at least adjacent to the first end and the second end and configured to displace the membrane relative to the substrate.

2. The atomic force microscope sensing structure of claim 1, wherein the first gap width is greater than the second gap width.

3. The atomic force microscope sensing structure of claim 1, wherein the actuating element includes a first member and a spaced apart second member, the first member configured to displace the membrane independently from the second member, thereby allowing movement of the central portion of the membrane in a direction that is other than normal to the substrate.

4. The atomic force microscope sensing structure of claim 1, wherein the substrate is transparent and further comprising a diffraction grating disposed on the substrate to facilitate measurement of displacement of the membrane by detecting a diffraction pattern of a light beam reflected off of a surface of the membrane through the diffraction grating.

5. The atomic force microscope sensing structure of claim 1, further comprising a probe tip affixed to the central portion of the membrane.

* * * * *